United States Patent [19]

Muszik et al.

[11] E Re. 30,747

[45] Reissued Sep. 22, 1981

[54] ADHESIVE APPLICATOR CRAYONS

[75] Inventors: Janos A. Muszik, Dusseldorf; Wolfgang Dierichs, Dusseldorf-Holthausen, both of Fed. Rep. of Germany

[73] Assignee: Henkel Kommanditgesellschaft auf Aktien, Dusseldorf-Holthausen, Fed. Rep. of Germany

[21] Appl. No.: 92,376

[22] Filed: Nov. 8, 1979

Related U.S. Patent Documents

Reissue of:

[64] Patent No.: 3,576,776
Issued: Apr. 27, 1971
Appl. No.: 785,262
Filed: Dec. 19, 1968

[30] Foreign Application Priority Data

Feb. 1, 1968 [AT] Austria ..... 998/68

[51] Int. Cl.[3] ..... C09J 3/00; C09J 3/14

[52] U.S. Cl. ..... 260/22 R; 106/178; 106/211; 260/17.4 SG; 260/18 R; 260/23 R; 260/23 AR; 260/23 XA; 260/29.6 R; 260/29.6 HN; 260/33.4 R

[58] Field of Search ..... 106/178, 211; 260/17.4 SG, 22 RU, 23, 18 R, 29.6 R, 29.6 HN, 22 R

[56] References Cited

U.S. PATENT DOCUMENTS

| | | | |
|---|---|---|---|
| 2,368,767 | 2/1945 | Moore | 260/17.4 |
| 3,096,202 | 7/1963 | De Groot | 427/207 B |
| 3,267,052 | 8/1966 | Brennan | 260/5 |
| 3,313,635 | 4/1967 | Wollek et al. | 106/14 |
| 3,338,778 | 8/1967 | Hutchins et al. | 260/17.4 |
| 3,396,128 | 8/1968 | Matumoto et al. | 260/22 |
| 3,423,342 | 1/1969 | Kendall | 260/22 |
| 3,539,481 | 11/1970 | Parker | 260/27 |

FOREIGN PATENT DOCUMENTS 1737097 1/1957 Fed. Rep. of Germany .

OTHER PUBLICATIONS

Chemical Abstracts, vol. 53, 1959, p. 1648e.

Chemical Abstracts, vol. 53, No. 6, Mar. 25, 1959, p. 5602b.

Chemical Abstracts, vol. 54, No. 15, Aug. 10, 1960, p. 14875bc.

*Primary Examiner*—Ronald W. Griffin

*Attorney, Agent, or Firm*—Hammond & Littell, Weissenberger and Muserlian

[57] ABSTRACT

An adhesive applicator crayon comprising a shape-giving base consisting of a gel of a gel-forming salt of an aliphatic carboxylic acid having from 8 to 36 carbon atoms with a cation selected from the group consisting of alkali metals, ammonia and lower alkylamines, with a liquid selected from the group consisting of water, water-miscible organic solvents and mixtures thereof, and a content of an adhesive component selected from the group consisting of water-soluble and water-dispersible adhesives.

11 Claims, 1 Drawing Figure

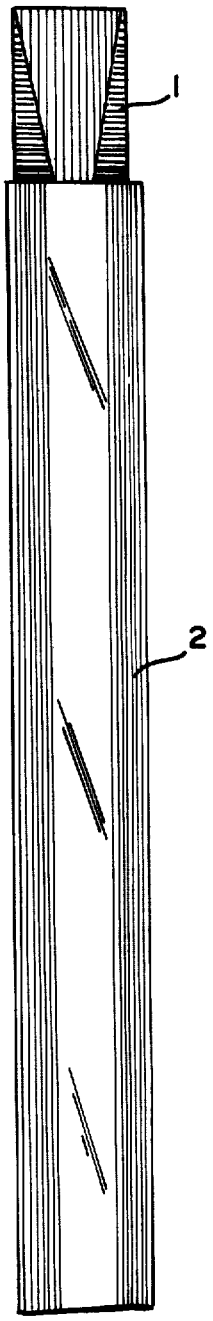
1
2

ADHESIVE APPLICATOR CRAYONS

Matter enclosed in heavy brackets [ ] appears in the original patent but forms no part of this reissue specification; matter printed in italics indicates the additions made by reissue.

THE PRIOR ART

It is known to prepare adhesive applicator crayons from rubber, resin and waxes. Surface layers must be rubbed off these adhesive applicator crayons under relatively high pressures in order to carry out the spreading of the adhesive. Due to the high pressures required for application, it can easily happen that the crayon itself breaks and that those parts which are to be glued together, such as thin paper, are damaged during a rubbing off of a portion of the adhesive applicator crayon material.

OBJECTS OF THE INVENTION

An object of the present invention is the obtention of an adhesive applicator crayon which can be easily spread on foundations to be bonded, which adhesive applicator crayon is age resisting and which lead to a quick adhesion.

Another object of the invention is the obtention of an adhesive applicator crayon comprising of a shape-giving base consisting of a gel of a gel-forming salt of an aliphatic carboxylic acid having from 8 to 36 carbon atoms with a cation selected from the group consisting of alkali metals, ammonia and lower alkylamines, with a liquid selected from the group consisting of water, water-miscible organic solvents and mixtures thereof, and a content of an adhesive component selected from the group consisting of water-soluble and water-dispersible adhesives.

These and other objects of the invention will become further apparent as the description proceeds.

DESCRIPTION OF THE INVENTION

It has now been discovered that the problems of the prior art can be overcome in the development of an adhesive applicator crayon comprising a shape-giving base consisting of a gel of a gel-forming salt of an aliphatic carboxylic acid having from 8 to 36 carbon atoms with a cation selected from the group consisting of alkali metals, ammonia and lower alkylamines, with a liquid selected from the group consisting of water, water-miscible organic solvents and mixtures thereof, and a content of an adhesive component selected from the group consisting of water-soluble and water-dispersible adhesives.

FIG. 1 depicts the adhesive applicator crayon of the invention.

The aliphatic carboxylic acids having from 8 to 36 carbon atoms utilized as the gel-formers can be either branched or straight chain and may contain double bonds or single substituents such as chloro or bromo. Preferably the aliphatic carboxylic acids having from 8 to 36 carbon atoms should be alkanoic acids, alkenoic acids, alkadienoic acids and their monohalogen substituted acids and particularly fatty acids with 12 to 22 carbon atoms. These can be obtained from natural fats or oils. The alkali metal, ammonium or lower alkyl ammonium salts of the carboxylic acids should be water soluble. Particularly favorable results are obtained with sodium stearate. Generally, the sodium salts of the other fatty acids with 12 to 22 carbon atoms are preferred as well. However, the lithium salts, potassium salts or ammonium salts, possibly substituted by lower alkyl radicals may also be utilized as the gel forming ingredient.

For the preparation of the gel forming the shape-giving base of the adhesive applicator crayon, the alkali metal or ammonium salts of the aliphatic carboxylic acids are disolved in water and/or water-miscible organic solvents. In addition to mixed aqueous solvents, water or water-miscible organic solvents alone can be employed. Preferred for the preparation of the gel are aqueous systems. The most suitable organic solvents are primarily lower monohydric and polyhydric alcohols for instance, water-miscible lower alkanols, such as methanol, ethanol, isopropanol; water-miscible lower alkanediols, such as ethylenglycol and water-miscible lower alkanetriols, such as glycerine. Butanol, amyl alcohols and benzyl alcohol as well as dioxane, acetonitrile, tetrahydrofuran, dimethylformamide or dimethylsulfoxide are also useful in small amounts. Moreover, as water-miscible organic solvents, ketones, preferably lower alkanones, such as acetone, methylethylketone are also suitable. For the adhesive component of the adhesive applicator crayons of the invention, the known film-forming, water-soluable or water-dispersible adhesives are employed. Both natural as well as synthetic polymeric substances can be used as the water-soluble adhesives. Suitable are, for instance, salts, preferably alkali metal salts of polyacrylic and polymethacrylic acids, polyacrylamides or mixed polymerizates of acrylamide with N-alkyl substituted acrylamides, as well as polyvinylpyrrolidone. Particularly favorable results are obtained with polyvinylpyrrolidone with a molecular weight of approximately 500,000 to 900,000. Furthermore cellulose derivatives such as methyl and ethyl cellulose, hydroxyethylcellulose, carboxymethylcellulose, degraded water soluble starch and ethoxylated and propoxylated starch derivatives, carboxymethyl starch and the like may be employed as the water-soluble adhesive component.

Moreover, as water-dispersible adhesives, for instance, phenolic resins; alkyd resins; alkyd resins modified with linseed oil, recinic acid, castor oil, soybean oil, coconut oil, tall oil, and fish oil; acrylated alkyd resins; polyvinyl acetals; polyvinyl acetates; polyvinyl butyrates; polyvinyl ethers; polyvinyl chloride; mixed polymerizate of vinyl chloride with vinylidene chlorides; as well as polyacrylic acid esters and polymethacrylic acid esters, may be employed.

The choice of the components of the adhesive applicator crayon should be made in such way that the mass formed is not too soft but, from which material can be easily rubbed off. The content of the gel-forming substance, that is in particular the alkali metal or ammonium salts of the aliphatic carboxylic acids, should be approximately from 2% to 25%, in particular from 5% to 8%. The liquid component of the gel should be approximately from 25% to 80%, in particular from 30% to 70%. The amount of the adhesive substance should be between approximately 5% to 40%, in particular 20% to 35%. The percentages given are percents by weight and refer to the total of the gel-forming substance, of the liquid components and of the adhesive substance.

Aside from the above named essential components, the adhesive applicator crayon of the invention may as well contain other adjuvants. As such come into consideration, for instance, adhesive resins such as colophony, cumarone, indene, furan, ketone, maleate, and sulfonamide resins as well as urea, melamine or phenolic resins.

Further as adjuvants, plasticizers or moisture retainers such as for instance, tri- and tetraethyleneglycol, sorbitol, mannitol, glycose, ethoxylated glucose and lower molecular weight polyethyleneglycols with a molecular weight up to approximately 4,000 can be employed. Glycerine or ethylene glycol also act as plasticizers when employed as the liquid component. These substances are conductive to an easy, soft rubbing.

Moreover, it is possible that the adhesive applicator crayons of the invention contain a minor amount of dyestuffs as well as pigments. Finally, they may contain odor improving compounds, such as pine-needle oil, eucalyptus oil, aniseed oil, benzaldehyde and the like.

For the preparation of the adhesive applicator crayons of the invention, it is useful to mix the individual components while heating them to temperatures of 60° to 95° C. After a homogeneous mixture has been formed, the hot mass is poured into molds or is molded by means of an extruder into a rope and is cut into pieces.

The molded adhesive applicator crayons of the invention may be used as such. However, it is preferable to surround the crayon with a type of vapor barrier in order to prevent a rapid evaporation of the liquid component of the gel. This vapor barrier may take the form of a paper overwrap as is customary with a common crayon. Also the adhesive applicator crayon may be inserted into a metal or plastic tube which may have a means for exposing the tip of the adhesive applicator crayon as it is used, such as a lipstick tube.

In the FIGURE, the adhesive applicator crayon 1 is surrounded by a paper tube 2.

The adhesive applicator crayons of the invention allow a clean, application of the adhesive substance which application is free from fibers and drips. Due to the soft rubbing off on abrasion, a sufficient application of the adhesive substance is provided which causes a quick felting bond on paper. Thus the mounting of photographs can be carried out without soiling of the picture side of the photograph. Porous materials such as paper of all kinds and all thicknesses as well as thin metal foils can be bonded.

The adhesive applicator crayons possess an excellent stability of shape but yet can be applied easily. The advantage of the gel formation allows the utilization of relatively large amounts of solvent, but moisture retention is improved, drying out is retarded and a good storage stability is obtained.

The following examples are illustrative of the practice of the invention. They are, however, not to be deemed limitative in any manner.

EXAMPLE 1

In a 2-liter three-neck-flask equipped with a stirrer, 470 g. of water, 140 g. of glycerine and 70 g. of sodium stearate were added and heated under reflux to approximately 90° C. with stirring. After approximately 1 hour, the sodium stearate had gone into solution. Subsequently, 320 g. of polyvinylpyrrolidone with a molecular weight of approximately 700,000 were added in portions to the hot solution. The mixture, which at first was nonhomogeneous, was continuously stirred at 90° (6 hours), until a largely transparent adhesive mass free from bubbles was formed. The viscous hot mass was then poured into small glass tubes (10 mm.). Adhesive applicator crayons thus obtained were placed into cases such as are employed, for instance, for lipsticks.

The adhesive of the adhesive applicator crayon of the invention could easily be rubbed off, and without pulling any fibers, onto the surface which was to be bonded. Typewriter bond was bonded to photographic paper with the above adhesive applicator crayon as well as white cardboard with photographic paper and typewriter bond. After only one minute, a felted bond was formed. Moreover thin foils of brass and aluminum were bonded to one another as well as with letter bond and with cardboard.

EXAMPLE 2

50 g. of sodium myristate were dissolved in 100 g. of glycerine, 80 g. of water and 470 g. of ethanol and mixed with 300 g. of a mixed polymerisate of vinyl acetate with 20% of vinyl laurate (K-value approximately 51). The preparation of the adhesive mass and the adhesive applicator crayon was carried out as described in Example 1.

EXAMPLES 3 to 6

In a heatable glass flask which is equipped with a stirrer and a condenser, different mixtures of the components which are listed in the following table were prepared in the way as described in Example 1. In all cases adhesive applicator crayons were obtained from which adhesive material could be easily rubbed off, which after 1 to 3 minutes gave felted bonds on paper.

TABLE

| Example | Sodium stearate gm. | Glycerine, gm. | Water, gm. | Poly-vinyl-pyrrolidone, gm. | Ricinicalkyd resin, gm. | Ethoxylated glucose OH value 830, gm. | Mg-k-Al-silicate[1] gm. |
|---|---|---|---|---|---|---|---|
| 3 | 7 | ---------- | 51 | 32 | ---------- | 10 | ---------- |
| 4 | 8 | 14 | 41 | 30 | 5 | ---------- | 2 |
| 5 | 8 | ---------- | 43 | 30 | 5 | 14 | ---------- |
| 6 | 7 | ---------- | 47 | 27 | 5 | 14 | ---------- |

[1]Very finely ground plastorite.

The preceding specific embodiments are illustrative of the practice of the invention. It is to be understood, however, that other expedients known to those skilled in the art or disclosed herein may be employed without departing from the spirit of the invention.

We claim:

1. An adhesive applicator crayon comprising a shape-giving base consisting of a gel of a gel-forming salt of an aliphatic carboxylic acid having from 8 to 36 carbon atoms with a cation selected from the group consisting of alkali metals, ammonia and lower alkylamines, in an aqueous liquid selected from the group consisting of water and mixtures of water with water-miscible organic solvents, with a content of from 5% to 40%, based on the total [amount of constituents in said crayon] *of the gel-forming substance, of the liquid components and of the adhesive substance*, of a film-forming adhesive component selected from the group consisting of water-soluble and water-dispersable adhesives.

2. The adhesive applicator crayon of claim 1 wherein said gel-forming salt is present in an amount of between 2% and 25% by weight, said liquid is present in an amount of between 25% and 80% by weight and said adhesive component is present in an amount of from 5% to 40% by weight, said percentages relating to the total amount of the aforesaid three components.

3. The adhesive applicator crayon of claim 1 wherein said gel-forming salt is present in an amount of between 5% to 8% by weight, said liquid is present in an amount of between 30% to 70% by weight and said adhesive component is present in an amount of from 20% to 35% by weight, said percentages relating to the total amount of the aforesaid three components.

4. The adhesive applicator crayon of claim 1 wherein said aliphatic carboxylic acid having from 8 to 36 carbon atoms is selected from the group consisting of alkanoic acids, alkenoic acids, alkadienoic acids and monohalogenated derivatives thereof.

5. The adhesive applicator crayon of claim 1 wherein said aliphatic carboxylic acid is a fatty acid having from 12 to 22 carbon atoms.

6. The adhesive applicator crayon of claim 1 wherein said gel-forming salt of an aliphatic carboxylic acid having from 8 to 36 carbon atoms is sodium stearate.

7. The adhesive applicator crayon of claim 1, wherein said film-forming adhesive component is a water-soluble polyvinylpyrrolidone having an average molecular weight of between 500,000 and 900,000.

8. An adhesive applicator crayon comprising a shape-giving base consisting of a gel of a gel-forming sodium salt of a fatty acid having from 12 to 22 carbon atoms in an aqueous liquid selected from the group consisting of water and mixtures of water with water-miscible organic solvents, with a content of from 5% to 40%, based on the total [amount of constituents in said crayon] *of the gel-forming substance, of the liquid components and of the adhesive substance*, of a film-forming adhesive component selected from the group consisting of water-soluble alkali metal salts of polyacrylic and polymethacrylic acids, water-soluble polyacrylamides, water-soluble mixed polymerizates of acrylamide and N-alkylacrylamides, water-soluble polyvinylpyrrolidone, water-soluble cellulose derivatives, degraded water-soluble starch, water-soluble ethoxylated and propoxylated starch derivatives, water-soluble carboxymethyl starch, water-dispersible phenolic resins, water-dispersible alkyd resins, water-dispersible alkyd resins modified with linseed oil, ricinic acid, castor oil, soybean oil, coconut oil, tall oil and fish oil, water-dispersible acrylated alkyd resins, water-dispersible polyvinyl acetals, polyvinyl acetates, polyvinyl butyrates, polyvinyl ethers, polyvinyl chloride, water-dispersible mixed polymerizates of vinyl chloride and vinylidene chlorides, water-dispersible mixed polymerizates of vinyl esters of fatty acids and water-dispersible polyacrylic acid esters and polymethacrylic acid esters.

9. The process of preparing an adhesive applicator crayon which comprises the steps of forming a gel from a gel-forming salt of an aliphatic carboxylic acid having from 8 to 36 carbon atoms with a cation selected from the group consisting of alkali metals, ammonia and lower alkylamines, and an aqueous liquid selected from the group consisting of water and mixtures of water with water-miscible organic solvents, melting said gel at a temperature of between 60° C. and 95° C., adding a film-forming adhesive component selected form the group consisting of water-soluble and water-dispersible adhesives in an amount of from 5% to 40%, based on the total [amount of constituents in said crayon] *of the gel-forming substance, of the liquid components and of the adhesive substance*, cooling and molding said mixture and recovering said adhesive applicator crayon.

*10. An adhesive applicator crayon comprising a shape-giving base consisting of a gel of a gel-forming sodium salt of a fatty acid having from 12 to 22 carbon atoms, in an amount of between 2% and 25% by weight, based on the total of the gel-forming substance, of the liquid components and of the adhesive substance, in an aqueous liquid selected from the group consisting of water and mixtures of water with water-miscible, organic solvents, in an amount of between 25% and 80% by weight, based on the total of the gel-forming substance, of the liquid components and of the adhesive substance, with a content of from 5% to 40% based on the total of the gel-forming substance, of the liquid components and of the adhesive substance, of a film-forming adhesive component selected from the group consisting of water-soluble alkali metal salts of polyacrylic and polymethacrylic acids, water-soluble polyacrylamides, water-soluble mixed polymerizates of acrylamide and N-alkylacrylamides, water-soluble polyvinylpyrrolidone, water-soluble cellulose derivatives, degraded water-soluble starch, water-soluble ethoxylated and propoxylated starch derivatives, water-soluble carboxymethyl starch, water-dispersible phenolic resins, water-dispersible alkyd resins, water-dispersible alkyd resins modified with linseed oil, ricinic acid, castor oil, soybean oil, coconut oil, tall oil and fish oil, water-dispersible acrylated alkyl resins, water-dispersible polyvinyl acetals, polyvinyl acetates, polyvinyl butyrates, polyvinyl ethers, polyvinyl chloride, water-dispersible mixed polymerizates of vinyl chloride and vinylidene chlorides, water-dispersible mixed polymerizates of vinyl esters of fatty acids and water-dispersible polyacrylic acid esters and polymethacrylic acid esters.*

*11. The process of preparing an adhesive applicator crayon which comprises the steps of forming a gel from a gel-forming salt of an aliphatic carboxylic acid having from 8 to 36 carbon atoms with a cation selected from the group consisting of alkali metals, ammonia and lower alkylamines, in an amount of between 2% and 25% by weight, based on the total of the gel-forming substance, of the liquid components and of the adhesive substance, and an aqueous liquid selected from the group consisting of water and mixtures of water with water-miscible organic solvents, in an amount of between 25% and 80% by weight, based on the total of the gel-forming substance, of the liquid components and of the adhesive substance, melting said gel at a temperature of between 60° C. and 95° C., adding a film-forming adhesive component selected from the group consisting of water-soluble and water-dispersible adhesives, in an amount of from 5% to 40%, based on the total of the gel-forming substance, of the liquid components and of the adhesive substance, cooling and molding said mixture and recovering said adhesive applicator crayon.*

* * * * *